United States Patent
Champagne et al.

(10) Patent No.: US 9,222,013 B1
(45) Date of Patent: Dec. 29, 2015

(54) WATER-IN-OIL MICROEMULSIONS FOR OILFIELD APPLICATIONS

(75) Inventors: Lakia M. Champagne, Baton Rouge, LA (US); David S. Morrison, The Woodlands, TX (US)

(73) Assignee: CESI Chemical, Inc., Houston, TX (US)

( * ) Notice: Subject to any disclaimer, the term of this patent is extended or adjusted under 35 U.S.C. 154(b) by 626 days.

(21) Appl. No.: 12/618,535

(22) Filed: Nov. 13, 2009

Related U.S. Application Data

(60) Provisional application No. 61/114,125, filed on Nov. 13, 2008.

(51) Int. Cl.
C09K 8/58 (2006.01)
E21B 43/26 (2006.01)
C09K 8/584 (2006.01)

(52) U.S. Cl.
CPC ..................................... *C09K 8/584* (2013.01)

(58) Field of Classification Search
None
See application file for complete search history.

(56) References Cited

U.S. PATENT DOCUMENTS

| | | |
|---|---|---|
| 3,060,210 A | 4/1961 | De Groote |
| 3,047,062 A | 7/1962 | Meadors |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,206,809 A | 6/1980 | Jones |
| 4,276,935 A | 7/1981 | Hessert et al. |
| 4,360,061 A | 11/1982 | Canter et al. |
| 4,414,128 A | 11/1983 | Goffinet |
| 4,511,488 A | 4/1985 | Matta |
| 4,650,000 A | 3/1987 | Andreasson et al. |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,587,354 A | 12/1996 | Duncan, Jr. |
| 5,587,357 A | 12/1996 | Rhinesmith |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A * | 7/2000 | Chan et al. ................... 507/110 |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |

(Continued)

FOREIGN PATENT DOCUMENTS

| | | |
|---|---|---|
| CA | 2345305 | 4/2000 |
| CA | 2394858 | 6/2001 |

(Continued)

OTHER PUBLICATIONS

[No Author Listed], The HLB system: a time-saving guide to emulsifier selection. ICI Americas Inc. 1976. Revised 1980. 22 pages.
Haw, The HLB system: a time saving guide to surfactant selection. Presentation to the Midwest chapter of the society of cosmetic chemists. Mar. 9, 2004. 39 slides.
ADM, Evolution Chemicals E5789-117 Description. Jun. 2014.
Brost et al., Surfactants assist water-in-oil monitoring by fluroescence. World Oil. Oct. 2008;229(10). Published Online.
Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

(Continued)

*Primary Examiner* — John J Figueroa
(74) *Attorney, Agent, or Firm* — Wolf, Greenfield & Sacks, P.C.

(57) ABSTRACT

A well treatment microemulsion includes an oil external phase, an internal aqueous phase and a hydrophilic surfactant. The surfactant has a hydrophile lipophile balance of between 8-18. The oil external phase may include d-Limonene, xylenes, light mineral oil, or kerosene. The surfactant is configured to emulsify the water of the internal aqueous phase into the oil of the external (continuous) phase. The surfactant may include polyoxyethylene sorbitan monooleate, polyoxyethylene sorbitan tristearate, polyoxyethylene hydrogenated castor oil, polyoxyethylene sorbitan monostearate, polyoxyethylene sorbitan monooleate, polyoxyethylene sorbitan monolaurate or mixtures therebetween. The use of hydrophilic surfactants to emulsify an internal aqueous phase within an oil external microemulsion produces unexpected and beneficial results.

18 Claims, No Drawings

(56) References Cited

U.S. PATENT DOCUMENTS

| | | |
|---|---|---|
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,939,832 B2 | 9/2005 | Collins |
| 6,984,610 B2 | 1/2006 | VonKrosigk et al. |
| 7,021,378 B2 | 4/2006 | Prukop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 * | 11/2009 | Tuzi et al. ............... 510/427 |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 * | 10/2014 | Parnell et al. ............... 507/224 |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1 * | 9/2003 | Pursley et al. ............... 507/200 |
| 2006/0014648 A1 | 1/2006 | Milson et al. |
| 2007/0123445 A1 * | 5/2007 | Tuzi et al. ............... 510/407 |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 * | 11/2008 | Pursley et al. ............... 507/218 |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0260819 A1 | 10/2009 | Kurian et al. |
| 2009/0275488 A1 | 11/2009 | Zamora et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0015852 A1 | 1/2012 | Quintero et al. |
| 2012/0035085 A1 | 2/2012 | Parnell et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |

(56) References Cited

U.S. PATENT DOCUMENTS

| | | |
|---|---|---|
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0110344 A1 | 4/2014 | Hoag et al. |
| 2014/0202700 A1 | 7/2014 | Blair |
| 2014/0299325 A1 | 10/2014 | Zelenev et al. |
| 2014/0332212 A1 | 11/2014 | Ayers et al. |

FOREIGN PATENT DOCUMENTS

| | | |
|---|---|---|
| CN | 102127414 | 7/2011 |
| CN | 102277143 | 12/2011 |
| CN | 103614128 | 3/2014 |
| CN | 103642477 | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 99/49182 | 9/1999 |
| WO | WO 2007/011475 | 1/2007 |
| WO | WO 2012/158645 | 11/2012 |

OTHER PUBLICATIONS

Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

* cited by examiner

WATER-IN-OIL MICROEMULSIONS FOR OILFIELD APPLICATIONS

RELATED APPLICATIONS

This application claims the benefit of U.S. Provisional Patent Application Ser. No. 61/114,125, filed Nov. 13, 2008, entitled "Water-in-Oil Microemulsions for Oilfield Applications," the disclosure of which is herein incorporated by reference.

FIELD OF THE INVENTION

The present invention generally relates to the production of petroleum and more particularly to compositions and processes for improving the recovery of petroleum from a subterranean geological formation.

BACKGROUND OF THE INVENTION

For many years, petroleum has been recovered from subterranean reservoirs through the use of drilled wells and production equipment. During the production of desirable hydrocarbons, such as crude oil and natural gas, a number of other naturally occurring substances may also be encountered within the subterranean environment.

Many undesirable downhole products must be managed during the production of hydrocarbons. For example, scale, paraffins, fines, sulfur, heavy oil tar by-products, hydrogen sulfide, and water blocks commonly accumulate in and around the formation, well casing, production tubing and recovery equipment. Alternatively, it may be necessary to remove injected fluids from the near wellbore area, such as drilling fluids, cement filtrate, kill fluids, polymers and water blocks. To maintain an efficient recovery of petroleum, it is frequently necessary to clean or remove these accumulations and deposits.

The removal of unwanted deposits from the wellbore and production equipment is generally referred to as "remediation." In contrast, the term "stimulation" generally refers to the treatment of geological formations to improve the recovery of hydrocarbons. Common stimulation techniques include well fracturing and acidizing operations. Well remediation and stimulation are important services that are offered through a variety of techniques by a large number of companies.

The effectiveness of well remediation and stimulation operations is greatly affected by the chemical agents used during these services. Operators have discovered that microemulsions can offer an advantageous vehicle for delivering solvents or other treatment chemicals to a targeted treatment area. Microemulsions are characterized as either water-in-oil (an aqueous phase is dispersed in an oil phase) or oil-in-water (an oil phase dispersed in an aqueous phase) mixtures. Microemulsions comprise droplets having a diameter in the range of about 1-100 nm. These systems appear clear or transparent to the human eye compared to conventional emulsion systems which have droplet sizes >400 nm in diameter and a cloudy appearance. Microemulsions are thermodynamically stable and exhibit no phase separation.

The separation of the oil and water phases depends on the creation of an interface of surfactant molecules between the water and oil molecules. Nonionic surfactants are often classified according to the hydrophile-lipophile balance (HLB) system. The HLB value of a surfactant is a measure of the degree to which it is hydrophilic or lipophilic, determined by calculating values for the different regions of the molecule. Originally, the HLB value was defined as a relative measure of the ratio of the weight percent ethylene oxide (EO) in a given nonionic surfactant.

Surfactants with lower HLB values are typically used for making oil-external (water-in-oil) microemulsions, while surfactants with higher HLB values are used for making water external (oil-in-water) microemulsions.

The prior art includes many examples that show that surfactants with an HLB generally greater than about 8 will produce oil-in-water emulsions, while surfactants with an HLB of about 3 to 8 will produce water-in-oil emulsions.

U.S. Pat. No. 7,380,606 (Pursley, et al.; Jun. 3, 2008) titled "Composition and Process for Well Cleaning" states that water-in-oil microemulsions should be prepared using surfactants with an HLB value of between 3 and 8, while oil-in-water microemulsions are prepared with surfactants having an HLB of 8 to 18.

An article by D. F. Brost and J. Silveira titled, "Surfactants Assist Water-in-Oil Monitoring by Fluorescence" in the October 2008 online issue of World Oil states, "Surfactants with an HLB less than 10 stabilize water-in-oil emulsions. Surfactants with an HLB greater than 10 stabilize oil-in-water emulsions. Within that group, surfactants with an HLB of 12-15 act as detergents and are commonly used to remove oil from solid surfaces."

U.S. Pat. No. 3,919,411 titled, "Injectible Adjuvant and Compositions Including Such Adjuvant", Nov. 11, 1975 by Glass, et al. states, "Where surfactants are used for dispersing oil in water, the final HLB number should be above 6. In the case where surfactants are used of the type for dispersing water in oil, the final HLB number should be below 6."

In a presentation given to the Midwest Chapter of the Society of Cosmetic Chemists in 2004, Uniqema reported that for making water-in-oil emulsions, surfactants with HLBs of 4-6 should be chosen, while surfactants with HLBs of 8-16 should be used when making oil-in-water emulsions.

In direct contrast to the prior art, the present invention describes the surprising discovery that high HLB surfactants can be used to produce water-in-oil microemulsions that find use in oilfield and well treatment applications.

Although a number of compounds and techniques are known in the prior art, there is a continued need for more effective microemulsions for remediation stimulation services. There is a particular need to identify new surfactants and surfactant mixtures that can be used to prepare stable microemulsions.

SUMMARY OF THE INVENTION

In preferred embodiments, a well treatment microemulsion includes an oil external phase, an internal aqueous phase and a surfactant. The surfactant has a hydrophile lipophile balance of between 8-18. The oil external phase may include but is not necessarily limited to d-Limonene, xylenes, light mineral oil, or kerosene. The surfactant is configured to emulsify the water of the internal aqueous phase into the oil of the external (continuous) phase. Suitable surfactants may include but are not necessarily limited to polyoxyethylene sorbitan monooleate, polyoxyethylene sorbitan tristearate, polyoxyethylene hydrogenated castor oil, polyoxyethylene sorbitan monostearate, polyoxyethylene sorbitan monooleate, polyoxyethylene sorbitan monolaurate or mixtures therebetween.

DETAILED DESCRIPTION OF PREFERRED EMBODIMENTS

In preferred embodiments, the present invention relates to the preparation of an oil external microemulsion, using a high HLB surfactant or surfactant mixture. It is well known that when two or more surfactants are mixed together, the HLB of the resulting combination is a weighted average of the HLBs of each of the components of the surfactant mixture. This HLB is reported simply as the average HLB. Select surfactants and surfactant mixtures with high HLB values have been discovered to emulsify water in a hydrocarbon oil phase. The use of a high HLB surfactant or surfactant mixture provides a new range of surfactants that have not previously been used in oil external microemulsions. In a presently preferred embodiment, the well treatment microemulsion includes an oil external (continuous) phase, an aqueous internal (dispersed) phase, and a surfactant component. The water-in-oil microemulsion may also include an alcohol component. The aqueous phase is preferably formed with water.

The oil external phase preferably consists of a hydrocarbon terpene or mixture of hydrocarbon terpenes. In preferred embodiments, the oil external phase is formed by using terpene hydrocarbons derived from citrus, pine, eucalyptus, peppermint or other sources. In a particularly preferred embodiment, the oil external phase is prepared using d-Limonene (CAS #94266-47-4; citrus terpenes). d-Limonene is commercially available from a variety of sources and is characterized as a biodegradable solvent. In alternate preferred embodiments, the oil external phase is prepared from a mixture of terpene hydrocarbons. In yet another preferred embodiment, the oil external phase is prepared from non-terpene hydrocarbons, such as xylenes, paraffin oil, a mixture of cycloparaffinic and isoparaffinic hydrocarbon, and mineral oil.

In a preferred embodiment, the surfactant component is selected as a nonionic surfactant or surfactant mixture having an HLB value of between 8 and 18. In a more particularly preferred embodiment, the selected surfactant or surfactant mixture has an HLB value of between 10 and 17.

In a particularly preferred embodiment, the surfactant component is an ethoxylated alcohol. In a more preferred embodiment, the surfactant component is an ethoxylated C8-C18 alcohol. In a still more preferred embodiment, the surfactant component is an ethoxylated C8-C18 alcohol with 5-20 moles of ethylene oxide (EO).

In a particularly preferred embodiment, the surfactant component is an ethoxylated vegetable oil. In a more preferred embodiment, the surfactant component is an ethoxylated castor oil. In a still more preferred embodiment, the surfactant component is an ethoxylated castor oil with 25-45 moles of EO.

In a particularly preferred embodiment, the surfactant component is an ethoxylated amide. In a more preferred embodiment, the surfactant component is an ethoxylated C8-C18 amide. In a still more preferred embodiment, the surfactant component is an ethoxylated C8-C18 amide with 5-20 moles of EO.

In another particularly preferred embodiment, the surfactant component is an ethoxylated fatty acid. In a more preferred embodiment, the surfactant component is an ethoxylated C8-C18 fatty acid. In a still more preferred embodiment, the surfactant component is an ethoxylated C8-C18 fatty acid with 5-20 moles of EO.

In another preferred embodiment, the surfactant component is a polyoxyethylene fatty glyceride or a polyoxyethylene hydrogenated castor oil (ethoxylated castor oil).

In another preferred embodiment, the surfactant component is a polyoxyethylene sorbitan ester. In a more preferred embodiment, the surfactant component is a polyoxyethylene sorbitan monoester. In a still more preferred embodiment, the surfactant component is a polyoxyethylene sorbitan monooleate.

In another particularly preferred embodiment, the surfactant component is a combination of two or more of the following: ethoxylated alcohol, ethoxylated vegetable oil, ethoxylated amide, ethoxylated fatty acid, polyoxyethylene fatty glyceride, and polyoxyethylene sorbitan ester. In a more preferred embodiment, the surfactant component is a combination of two or more of the following: ethoxylated C8-C18 alcohol, ethoxylated castor oil, ethoxylated C8-C18 amide, ethoxylated C8-C18 fatty acid, polyoxyethylene fatty glyceride, and polyoxyethylene sorbitan monoester. In a still more preferred embodiment, the surfactant component is a combination of two or more of the following: ethoxylated C8-C18 alcohol with 5-20 moles of EO, ethoxylated castor oil with 25-45 moles of EO, ethoxylated C8-C18 amide with 5-20 moles of EO, ethoxylated C8-C18 fatty acid with 5-20 moles of EO, polyoxyethylene fatty glyceride, and polyoxyethylene sorbitan monooleate. In alternate preferred embodiments, other nonionic surfactants can be included with these combinations, as long as the HLB of the surfactant mixture is between 8 and 18. For example, sorbitan monooleate (HLB 4.3) can be included with one or more nonionic surfactants to create a suitable surfactant combination having an HLB between 8 and at least 11.

Some examples of surfactants that have been successfully used to create oil-external microemulsions include Stepantex CO-30 (ethoxylated castor oil with 30 moles of EO, sold by Stepan Company), Tomadol 91-6 (ethoxylated C9-C11 alcohol with 6 moles of EO, sold by Air Products), Biosoft N91-6 (ethoxylated C9-C11 alcohol with 6 moles of EO, sold by Stepan Company), Tween 20 (polyoxyethylene sorbitan monolaurate, sold by Croda USA), Tween 40 (polyoxyethylene sorbitan monopalmitate, sold by Croda USA), Tween 60 (polyoxyethylene sorbitan monostearate, sold by Croda USA), Tween (polyoxyethylene sorbitan tristearate, sold by Croda USA), Tween 80 (polyoxyethylene sorbitan monooleate, sold by Croda USA), Tween 81 (polyoxyethylene sorbitan monooleate, sold by Croda USA), a combination of Span 80 (sorbitan monooleate) and Cirrasol G-1292 Special (polyoxyethylene fatty glyceride; both sold by Croda USA), and Biosoft N1-9 (ethoxylated C11 alcohol with 9 moles of EO, sold by Stepan Company). It should be noted that surfactants and mixtures of surfactants (also known as "surfactant packages") often contain ingredients in addition to the specified surface active agents. These ingredients can vary from supplier to supplier, and may even vary within a particular supplier, as long as the resulting surfactant or surfactant package meets certain performance requirements and/or physical specifications. These ingredients may include normal product variations due to the manufacturing processes of the surfactant or surfactant package, and they may also include materials that are naturally introduced by the source feedstock. Other ingredients may be intentionally added to the surfactant or surfactant package. These ingredients include, but are not limited to, stabilizers, modifiers, solvents, antioxidants, dispersants, solubilizers, handling aids, physical property modifiers, and the like.

In yet another alternate preferred embodiment, the surfactant component selected is an anionic surfactant, including but not limited to sulfonates, specifically internal olefin sulfonates and linear alkylbenzene sulfonates. Presently preferred anionic surfactants include C15-C18 internal olefin sulfonates (available as Petrostep S2, sold by Stepan Company) and linear alkylbenzene sulfonate/linear sodium dodecylbenzene sulfonates (available as Polystep LAS-50, sold by Stepan Company).

In yet another alternate preferred embodiment, the surfactant component is selected as a combination of nonionic and anionic surfactants, such as but not limited to ethoxylated alcohols, ethoxylated castor oil, and sulfonates. Presently preferred nonionic/anionic surfactant combinations comprise ethoxylated C8-C18 alcohol with 5-20 moles EO, ethoxylated castor oil with 25-45 moles of EO, and C15-C18 internal olefin sulfonates.

The alcohol molecules of the well treatment microemulsion stabilize the microemulsion through interactions at the water and oil interface, thereby further stabilizing the microemulsion. The alcohol also lowers the freezing point of the well treatment microemulsion. Although isopropanol is presently preferred, alternative suitable alcohols include midrange primary, secondary and tertiary alcohols with between 1 and 20 carbon atoms, such as ethanol, t-butanol, n-butanol, n-pentanol, n-hexanol and 2-ethyl-hexanol. Other freeze prevention additives can additionally or alternatively be added, such as detergent range alcohols ethoxylate, ethylene glycols (EG), polyethylene glycols (PEG), propylene glycols (PG) and triethylene glycols (TEG), with triethylene glycol being presently preferred.

In preferred embodiments, the well treatment microemulsion comprises 30-60% by weight terpene mixture or nonterpene hydrocarbons (oil phase), 25-50% by weight surfactant or surfactant mixture (surfactant component), 5-30% by weight water (aqueous phase), 0-3% by weight TEG (alcohol) and 0-35% isopropyl alcohol (alcohol). Using the various components identified above, the following preferred well treatment microemulsion formulations can be prepared.

Example 1

An oil-external well treatment microemulsion includes a continuous oil phase, a dispersed water phase, alcohols and a surfactant mixture. The well treatment microemulsion contains about 41.8% by weight d-Limonene (external oil phase), about 14.4% by weight water (dispersed aqueous phase), about 9.64% by weight isopropanol (alcohol), about 1.36% by weight triethylene glycol (alcohol), and about 32.8% by weight surfactant mixture having an average HLB of about 10 and comprising the following surfactants: (i) polyoxyethylene castor oil (Cirrasol G-1292 Special, sold by Croda USA) and (ii) sorbitan monooleate (Span 80, sold by Croda USA).

Example 2

An oil-external well treatment microemulsion includes a continuous oil phase, a dispersed water phase, alcohols and a surfactant. The well treatment microemulsion contains about 35.8% by weight d-Limonene (external oil phase), about 9.4% by weight water (dispersed aqueous phase), about 32.4% by weight isopropanol (alcohol), about 1.6% by weight triethylene glycol (alcohol), and about 20.8% by weight surfactant having an HLB of about 10 and comprising the following surfactant: polyoxyethylene sorbitan monooleate (Tween 81, sold by Croda USA).

Example 3

An oil-external well treatment microemulsion includes a continuous oil phase, a dispersed water phase, alcohols and a surfactant mixture. The well treatment microemulsion contains about 41.8% by weight xylenes (external oil phase), about 14.4% by weight water (dispersed aqueous phase), about 9.64% by weight isopropanol (alcohol), 1.36% by weight triethylene glycol (alcohol), and about 32.8% by weight surfactant mixture having an average HLB of about 10 and comprising the following surfactants: (i) polyoxyethylene fatty glyceride (Cirrasol G-1292 Special, sold by Croda USA) and (ii) sorbitan monooleate (Span 80, sold by Croda USA).

Example 4

An oil-external well treatment microemulsion includes a continuous oil phase, a dispersed water phase, alcohol and a surfactant mixture. The well treatment microemulsion contains about 43% by weight of light mineral oil (external oil phase), about 10% by weight water (dispersed aqueous phase), about 11% by weight isopropanol (alcohol), and about 36% by weight of a surfactant mixture having an average HLB of about 10 and comprising the following surfactants: sorbitan monooleate (Span 80, sold by Croda USA) and polyoxyethylene sorbitan monooleate (Tween 80, sold by Croda USA).

Example 5

An oil-external well treatment microemulsion includes a continuous oil phase, a dispersed water phase, alcohols and a surfactant. The well treatment microemulsion contains about 35.8% by weight d-Limonene (external oil phase), about 9.4% by weight water (dispersed aqueous phase), about 32.4% by weight isopropanol (alcohol), about 1.6% by weight triethylene glycol (alcohol), and about 20.8% by weight surfactant having an HLB of about 10.5 and comprising the following surfactant: polyoxyethylene sorbitan tristearate (Tween 65, sold by Croda USA).

Example 6

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 9.64% by weight isopropanol (alcohol), about 1.36% by weight triethylene glycol (alcohol), and about 32.8% by weight surfactant having an HLB of about 10.8 and comprising the following surfactant: polyoxyethylene fatty glyceride (Cirrasol G-1292 Special, sold by Croda USA).

Example 7

An oil-external well treatment microemulsion includes a continuous oil phase, a dispersed water phase, alcohols and a surfactant package. The well treatment microemulsion contains about 41.8% by weight terpene hydrocarbon mixture-1 (external oil phase), about 14.4% by weight water (dispersed aqueous phase), about 1.6% by weight triethylene glycol (alcohol), about 6.4% by weight isopropanol (alcohol), and about 35.8% by weight surfactant mixture having an HLB of about 12.5 and comprising the following surfactant: ethoxylated C9-C11 alcohol with 6 moles EO (Tomadol 91-6, sold by Air Products).

Example 8

An oil-external well treatment microemulsion includes a continuous oil phase, a dispersed water phase, alcohols and a surfactant package. The well treatment microemulsion contains about 41.8% by weight d-Limonene (external oil phase), about 14.4% by weight water (dispersed aqueous phase), about 1.6% by weight triethylene glycol (alcohol), about 6.4% by weight isopropanol (alcohol), and about 35.8% by weight surfactant mixture having an average HLB of about 12.8 and comprising the following surfactants: (i) ethoxylated castor oil with 25-45 moles of EO and (ii) ethoxylated C8-C18 alcohol with 5-20 moles EO.

Example 9

An oil-external well treatment microemulsion includes a continuous oil phase, a dispersed water phase, alcohols and a surfactant package. The well treatment microemulsion contains about 41.8% by weight d-Limonene (external oil phase), about 14.4% by weight water (dispersed aqueous phase), about 1.6% by weight triethylene glycol (alcohol), about 6.4% by weight isopropanol (alcohol), and about 35.8% by weight surfactant having an HLB of about 13 and comprising the following surfactant: ethoxylated castor oil with 30 moles of EO (Stepantex CO 30, sold by Stepan Company).

Example 10

An oil-external well treatment microemulsion includes a continuous oil phase, a dispersed water phase, alcohols and a surfactant mixture. The well treatment microemulsion contains about 41.8% by weight d-Limonene (oil phase), about 14.4% by weight water (aqueous phase), about 1.6% by weight triethylene glycol (alcohol), about 6.4% by weight isopropanol (alcohol), and about 35.8% by weight surfactant mixture having an average HLB of about 13.1 and comprising the following surfactants: (i) ethoxylated C8-C18 amide with 5-20 moles of EO; (ii) ethoxylated castor oil with 25-45 moles of EO; and (iii) ethoxylated C8-C18 fatty acid with 5-20 moles of EO. Tables 1 and 2 below provides the thermal analysis and solubility tests, respectively, of the well treatment microemulsion of Example 10.

TABLE 1

Thermal Analysis of Oil External Microemulsion

| Temperature | Time | Observation | Stability |
|---|---|---|---|
| 72 F. | ≥24 hr | Clear | Homogenous/1 phase |
| 120 F. | ≥24 hr | Clear | Homogenous/1 phase |

TABLE 2

Solubility Tests of Oil External Microemulsion

| Condensate | Isopar L | d-Limonene | Water |
|---|---|---|---|
| Soluble | Soluble | Soluble | Insoluble |

Example 11

An oil-external well treatment microemulsion includes a continuous oil phase, a dispersed water phase, alcohols and a surfactant mixture. The well treatment microemulsion contains about 44.7% by weight citrus pine terpene-hydrocarbon mixture-1 (external oil phase), about 15.4% by weight water (dispersed aqueous phase), about 1.7% by weight triethylene glycol (alcohol), and about 38.2% by weight surfactant mixture having an average HLB of about 13.1 and comprising the following surfactants: (i) ethoxylated C8-C18 amide with 5-20 moles of EO; (ii) ethoxylated castor oil with 25-45 moles of EO; and (iii) ethoxylated C8-C18 fatty acid with 5-20 moles of EO.

Example 12

An oil-external well treatment microemulsion includes a continuous oil phase, a dispersed water phase, alcohols and a surfactant mixture. The well treatment microemulsion contains about 44.7% by weight citrus pine terpene-hydrocarbon mixture-2 (external oil phase), about 15.4% by weight water (dispersed aqueous phase), about 1.7% by weight triethylene glycol (alcohol), and about 38.2% by weight surfactant mixture having an average HLB of about 13.1 and comprising the following surfactants: (i) ethoxylated C8-C18 amide with 5-20 moles of EO; (ii) ethoxylated castor oil with 25-45 moles of EO; and (iii) ethoxylated C8-C18 fatty acid with 5-20 moles of EO.

Example 13

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 6.4% by weight isopropanol (alcohol), about 1.6% by weight triethylene glycol (alcohol), and about 35.8% by weight surfactant having an HLB of about 13.9 comprising the following surfactant: ethoxylated C11 alcohol with 9 moles EO (Biosoft N1-9, sold by Stepan Company).

Example 14

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 6.4% by weight isopropanol (alcohol), about 1.6% by weight triethylene glycol (alcohol), and about 35.8% by weight surfactant having an HLB of about 14.9 and comprising the following surfactant: polyoxyethylene sorbitan monostearate (Tween 60, sold by Croda USA).

Example 15

An oil-external well treatment microemulsion includes a continuous oil phase, a dispersed water phase, alcohol and a surfactant. The well treatment microemulsion contains about 40.2% by weight of a mixture of Conosol 145 (external oil phase comprised of cycloparaffinic and isoparaffinic hydrocarbons, sold by Calumet Specialty Products Partners), about 13.8% by weight water (dispersed aqueous phase), about 6.2% by weight isopropanol (alcohol), and about 39.8% by weight surfactant having an HLB of about 14.9 and comprising the surfactant: polyoxyethylene sorbitan monostearate (Tween 60, sold by Croda US).

Example 16

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 9.64% by weight isopropanol (alcohol), about 1.36% by weight triethylene glycol (alcohol), and about 32.8% by weight surfactant having an HLB of about 15 and comprising the following surfactant: polyoxyethylene sorbitan monooleate (Tween 80, sold by Croda USA).

Example 17

An oil-external well treatment microemulsion includes a continuous oil phase, a dispersed water phase, alcohol and a surfactant. The well treatment microemulsion contains about 42.5% by weight of kerosene (external oil phase), about 10.6% by weight water (dispersed aqueous phase), about 6.5% by weight tertiary butanol (alcohol), and about 40.4% by weight of a surfactant with an HLB of about 15 and comprising the following surfactant: polyoxyethylene sorbitan monooleate (Tween 80, sold by Croda USA).

Example 18

An oil-external well treatment microemulsion includes a continuous oil phase, a dispersed water phase, alcohols and a surfactant. The well treatment microemulsion can be made with aromatic comprising hydrocarbons. An example includes about 41.8% by weight xylenes (external oil phase), about 14.4% by weight water (dispersed aqueous phase), about 9.64% by weight isopropanol (alcohol), 1.36% by weight triethylene glycol (alcohol), and about 32.8% by weight surfactant having an HLB of about 15 and comprising the following surfactant: polyoxyethylene sorbitan monooleate (Tween 80, sold by Croda USA).

Example 19

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 6.4% by weight isopropanol (alcohol), about 1.6% by weight triethylene glycol (alcohol), and about 35.8% by weight surfactant having an HLB of about 15.6 and comprising the following surfactant: polyoxyethylene sorbitan monopalmitate (Tween 40, sold by Croda USA).

Example 20

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 6.4% by weight isopropanol (alcohol), about 1.6% by weight triethylene glycol (alcohol), and about 35.8% by weight surfactant having an HLB of about 16.7 and comprising the following surfactant: polyoxyethylene sorbitan monolaurate (Tween 20, sold by Croda USA).

Example 21

An oil-external well treatment microemulsion includes a continuous oil phase, a dispersed water phase, alcohols and a surfactant. The well treatment microemulsion contains about 44.7% by weight d-Limonene (external oil phase), about 15.4% by weight water (dispersed aqueous phase), about 1.7% by weight triethylene glycol (alcohol), and about 38.2% by weight anionic surfactant comprising a linear sodium dodecylbenzene sulfonate (Polystep LAS-50, sold by Stepan Company).

Example 22

An oil-external well treatment microemulsion includes a continuous oil phase, a dispersed water phase, alcohols and a surfactant. The well treatment microemulsion contains about 41.8% by weight d-Limonene (external oil phase), about 14.4% by weight water (dispersed aqueous phase), about 6.4% by weight isopropanol (alcohol), about 1.6% by weight triethylene glycol (alcohol), and about 35.8% by weight of a surfactant mixture comprising: (i) ethoxylated castor oil with 25-45 moles of EO, (ii) ethoxylated C8-C18 alcohol with 5-20 moles EO (iii), and an anionic surfactant comprising a C15-C18 internal olefin sulfonate (Petrostep S2, sold by Stepan Company).

Although for the purposes of the present disclosure preferred embodiments of the well treatment microemulsions are described in connection with well remediation, stimulation, acidizing operations, drilling operations and hydrogen sulfide mitigation applications, it will be understood that the inventive well treatment microemulsions can be used in additional, alternative applications. For example, it is contemplated that the well treatment microemulsion could also be used to clean surface equipment and downhole equipment.

In well remediation applications, the selected well treatment microemulsion is preferably injected directly into the wellbore through the production tubing or through the use of coiled tubing or similar delivery mechanisms. Once downhole, the well treatment microemulsion remedies drilling damage, fracturing fluid damage, water blocks and removes fines, asphaltenes and paraffins from the formation and wellbore. The well treatment microemulsion also serves to thin heavy hydrocarbons, alleviate water blocks and lower pore pressure in the formation.

During drilling operations, the well treatment microemulsions can be added to drilling fluids and injected into the wellbore through the drill string. The well treatment microemulsion is effective at removing fines and debris from the wellbore created by the drilling process.

The inventive well treatment microemulsions can also be used in stimulation operations.

The well treatment microemulsions can also be used to deliver acids during acidizing operations. Acids commonly used include hydrochloric, acetic, formic, and hydrochloric-hydrofluoric acids. In a presently preferred embodiment, the selected microemulsion is combined with an acidified carrier fluid to prepare a microemulsion suitable for acidizing operations.

As mentioned above, the inventive microemulsions can also be used for hydrogen sulfide mitigation. In preferred embodiments, the well treatment microemulsions are injected into the wellbore so that escaping hydrogen sulfide gas is "stripped" through the well treatment microemulsions. Preferably, the inventive microemulsion is periodically injected into problem wells to mitigate hydrogen sulfide production. Alternatively, the microemulsion can be injected downhole via capillary tubing on a continuous basis. In yet another alternate embodiment, the well treatment microemulsion can be placed in a container that is placed in fluid communication with the hydrogen sulfide.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the scope of the appended claims and within the spirit of the invention disclosed in the written description.

The invention claimed is:

1. A well treatment microemulsion having an internal aqueous phase and an external oil phase, the well treatment microemulsion comprising:
   about 35% to about 45% by weight of an oil in the external phase;
   about 21% to about 40% by weight of an emulsifying surfactant having a hydrophile lipophile balance of between 10 and 18, wherein the surfactant comprises a surfactant selected from the group consisting of ethoxylated castor oil comprising 25-45 moles of ethylene oxide, ethoxylated alcohols comprising 5-20 moles of ethylene oxide, ethoxylated amides comprising 5-20 moles of ethylene oxide, and ethoxylated fatty acids comprising 5-20 moles of ethylene oxide;
   about 1% to about 35% by weight of an alcohol;
   and the internal aqueous phase comprises about 9% to about 16% by weight water.

2. The well treatment microemulsion of claim 1, wherein the oil external phase comprises a hydrocarbon terpene.

3. The well treatment microemulsion of claim 2, wherein the oil external phase comprises at least one terpene hydrocarbon derived from the group of terpene hydrocarbon sources consisting of citrus, pine, eucalyptus, and peppermint.

4. The well treatment microemulsion of claim 1, wherein the oil external phase comprises d-limonene.

5. The well treatment microemulsion of claim 1, wherein the oil external phase comprises at least one component selected from the group consisting of xylenes, parrafin oil, a mixture of cycloparafinic and isoparaffinic oil, and mineral oil.

6. The well treatment microemulsion of claim 1, wherein the surfactant is selected from the group consisting of ethoxylated alcohols comprising 5-20 moles of ethylene oxide and mixtures of ethoxylated alcohols comprising 5-20 moles of ethylene oxide.

7. The well treatment microemulsion of claim 1, wherein the surfactant comprises a mixture of polyoxyethylene hydrogenated castor oil and sorbitan monooleate having an average hydrophile lipophile balance of about 10.

8. The well treatment microemulsion of claim 7, wherein the oil phase comprises between about 35% and 42% by weight d-Limonene, the surfactant comprises between about 30% and 35% by weight a mixture of polyoxyethylene hydrogenated castor oil and sorbitan monooleate and the aqueous phase comprises between about 10% and 15% by weight water.

9. The well treatment microemulsion of claim 1, wherein the aqueous phase comprises isopropanol.

10. The well treatment microemulsion of claim 1, wherein the surfactant is selected from the group consisting of polyoxyethylene sorbitan monostearate, polyoxyethylene sorbitan monooleate, polyoxyethylene sorbitan tristearate and polyoxyethylene sorbitan monolaurate.

11. The well treatment microemulsion of claim 10, wherein the oil phase comprises between about 30% and 45% by weight d-limonene, the surfactant comprises between about 30% and 45% by weight sorbitan monostearate and the aqueous phase comprises between about 10% and 15% by weight water.

12. The well treatment microemulsion of claim 11 further comprising isopropanol.

13. The well treatment microemulsion of claim 1, wherein the oil comprises about 41% to 42% by weight d-limonene, the emulsifying surfactant comprises about 32% to about 33% by weight of polyoxyethylene sorbitan monooleate, the alcohol comprises about 10% to about 12% by weight isopropanol, and the internal aqueous phase comprises about 14% to about 15% by weight water.

14. The well treatment microemulsion of claim 1, wherein the oil comprises about 35% to 36% by weight d-limonene, the emulsifying surfactant comprises about 20% to about 21% by weight of polyoxyethylene sorbitan monooleate, the alcohol comprises about 33% to about 35% by weight isopropanol, and the internal aqueous phase comprises about 10% by weight water.

15. The well treatment microemulsion of claim 1, wherein the oil comprises about 41% to 42% by weight hydrocarbon terpenes, the emulsifying surfactant comprises about 32% to about 33% by weight of polyoxyethylene sorbitan monooleate, the alcohol comprises 10% to about 12% by weight isopropanol, and the internal aqueous phase comprises about 14% to about 15% by weight water.

16. The well treatment microemulsion of claim 1, wherein the oil comprises about 35% to 36% by weight d-limonene, the emulsifying surfactant comprises about 20% to about 21% by weight of polyoxyethylene sorbitan tristearate, the alcohol comprises 33% to about 35% by weight isopropanol, and the internal aqueous phase comprises about 9% to about 10% by weight water.

17. The well treatment microemulsion of claim 1, wherein the oil comprises about 41% to 42% by weight d-limonene, the emulsifying surfactant comprises about 32% to about 33% by weight of polyoxyethylene sorbitan monooleate, the alcohol comprises about 10% to about 12% by weight isopropanol, and the internal aqueous phase comprises about 14% to about 15% by weight water.

18. The well treatment microemulsion of claim 1, wherein the surfactant comprises a surfactant selected from the group consisting of ethoxylated castor oil comprising 25-45 moles of ethylene oxide, ethoxylated amides comprising 5-20 moles of ethylene oxide, and ethoxylated fatty acids comprising 5-20 moles of ethylene oxide.

* * * * *